Aug. 10, 1965   R. DEFLANDRE   3,199,386
STRUCTURE OF MACHINE TOOLS AND THE LIKE
Filed Aug. 21, 1962   5 Sheets-Sheet 1
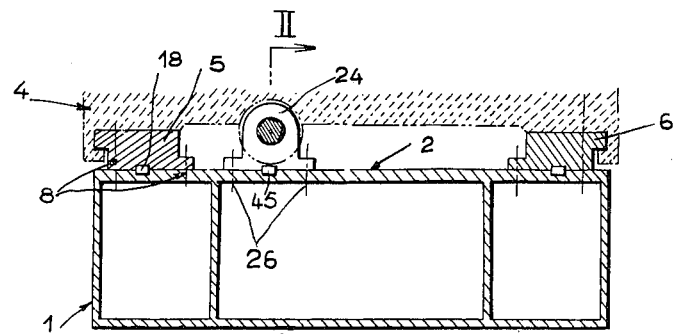
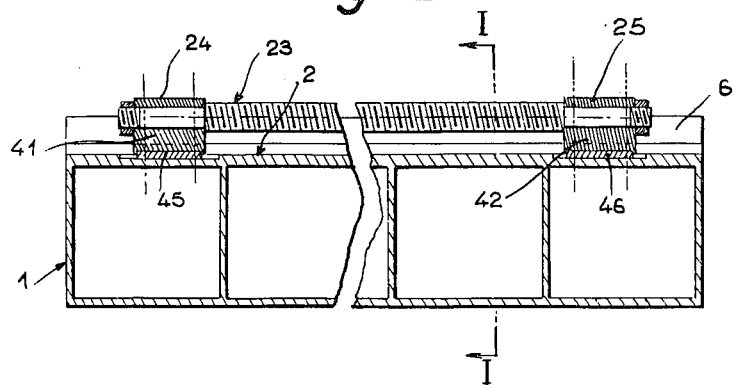
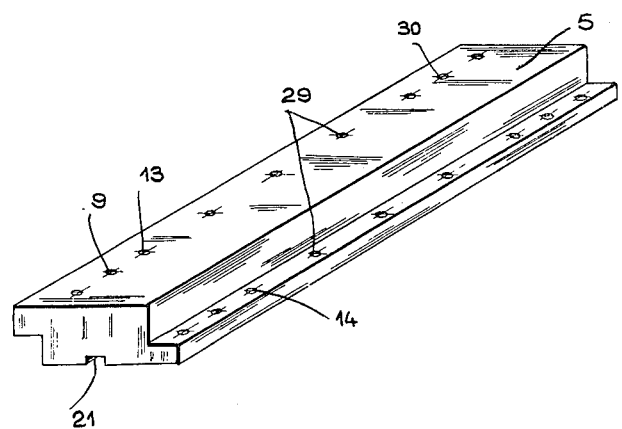

Aug. 10, 1965   R. DEFLANDRE   3,199,386
STRUCTURE OF MACHINE TOOLS AND THE LIKE
Filed Aug. 21, 1962   5 Sheets-Sheet 2
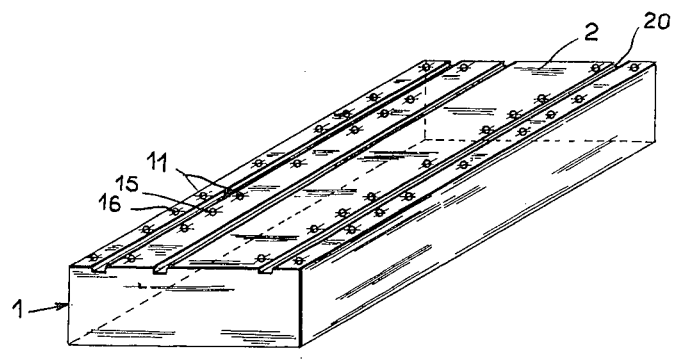
Fig:3
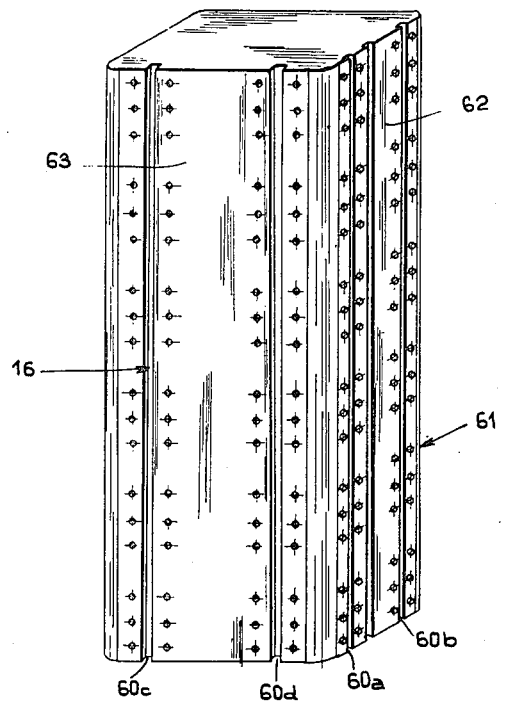
Fig: 11

Aug. 10, 1965  R. DEFLANDRE  3,199,386
STRUCTURE OF MACHINE TOOLS AND THE LIKE
Filed Aug. 21, 1962  5 Sheets-Sheet 3
Fig: 5
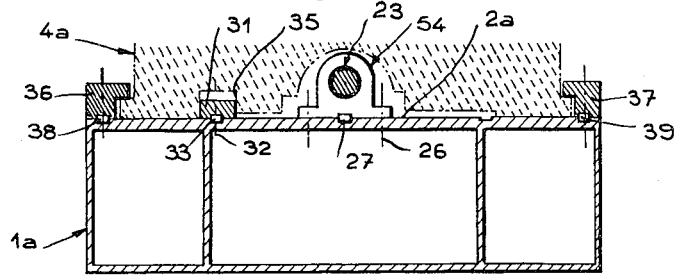
Fig: 6
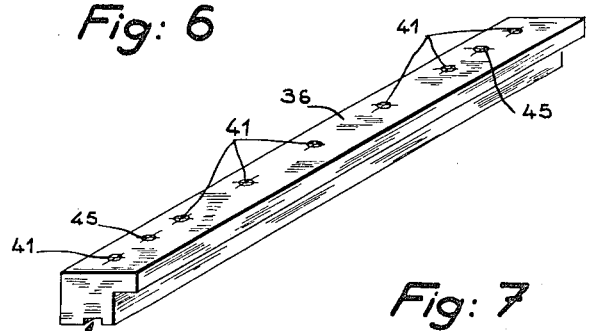
Fig: 7
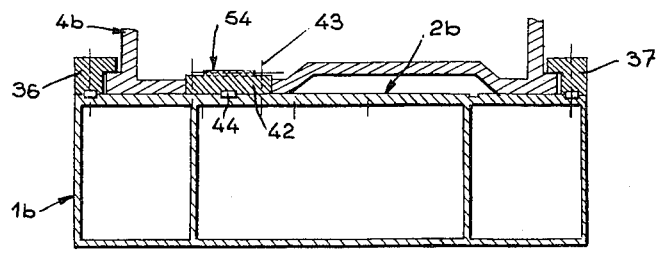
Fig: 8
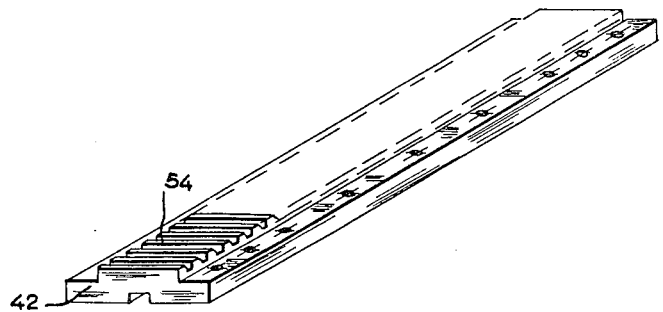

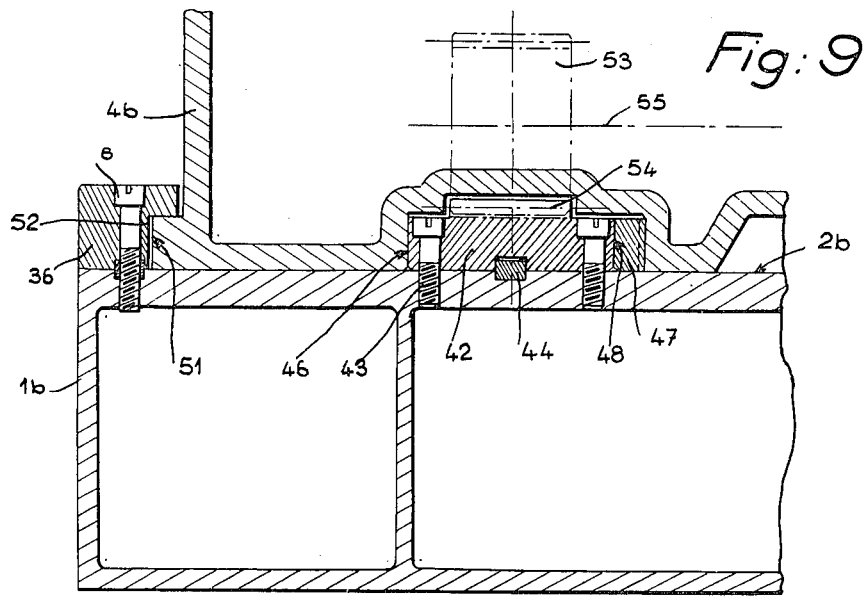
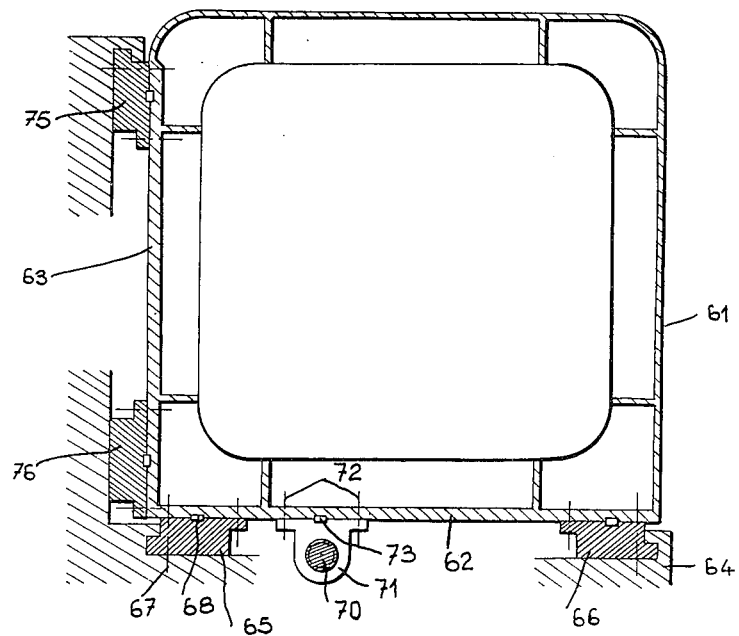

Aug. 10, 1965   R. DEFLANDRE   3,199,386
STRUCTURE OF MACHINE TOOLS AND THE LIKE
Filed Aug. 21, 1962   5 Sheets-Sheet 5
Fig: 12
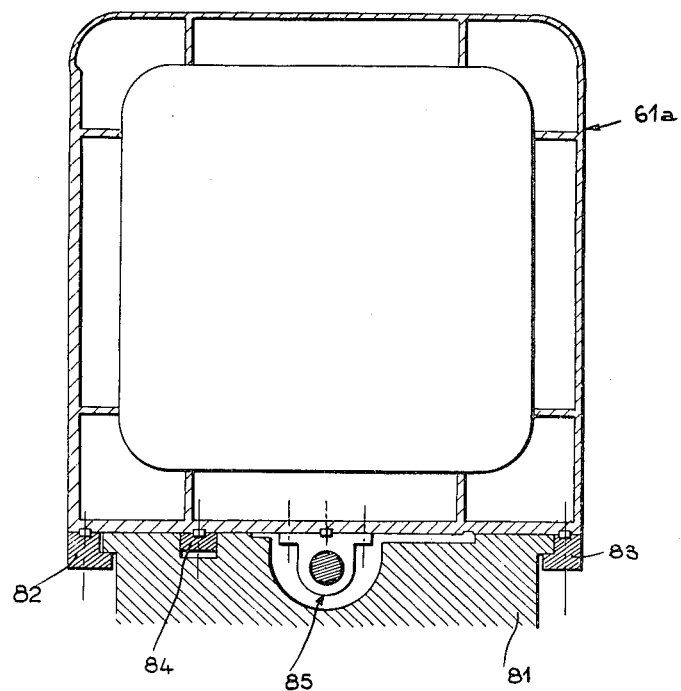

United States Patent Office
3,199,386
Patented Aug. 10, 1965

3,199,386
STRUCTURE OF MACHINE TOOLS AND THE LIKE
René Deflandre, Paris, France, assignor to Societe dite: Derefa Etablissement pour le Developpement, Recherches et Fabrications Industrielles, Vaduz, Liechtenstein
Filed Aug. 21, 1962, Ser. No. 218,373
Claims priority, application France, Aug. 29, 1961, 871,797
4 Claims. (Cl. 82—32)

In order to determine the shape of the support structure, particularly beds and uprights for machine tools, two main factors must be taken into account, these factors being the arrangement of the guideways and the drive means for the carriages which are to be mounted on the support structure, and the resistance of the structure to load and tool stresses, in particular cutting tools.

In the current designs for machine tools, the support structures are generally of one-piece design and comprise at least one surface having special contours corresponding to those of the carriages mounted thereon. In certain embodiments the guideways for the carriages are added onto the structure but in any case the latter always have a particular section corresponding either to the guideways resting surfaces or to the surfaces on which the carriage driving means are secured.

It may therefore be said that in all known constructions each machine tool support structure is designed to receive only the carriage which has been designed or suited to that particular machine or carriages having the same guiding and drive means. Such a design has the drawback that new support structures, frequently large and consequently expensive, are required to be constructed when it is desired to modify the shape of an existing carriage, or if it is desired to provide, for another function, the assembly of a different type of carriage having guide and drive means different from those of the carriage for which the support structure was originally designed.

Support structures having an incorporated guide section further have the drawback that the casting of these members is relatively difficult. In point of fact, complex sections bring about unequal shrinkage stresses, leading to flaws in, or even breakage of, their walls.

Finally the machining of support structures designed in this manner is difficult since it necessitates a large number of drilling, planing or smoothing operations in various planes, which may be parallel, perpendicular or inclined, and with a high degree of precision, on machines having larger dimensions. Moreover, scraping operations are also very costly since they are difficult to effect and necessitate frequent turning of heavy members.

The object of the present invention is to provide a new design in the general structure of machine tools, which design does not have the aforementioned drawbacks of the conventional design hereinbefore mentioned.

To this end and in accordance with the invention, there is provided a machine tool, wherein the surfaces of a support structure or part thereof (such as a bed or an upright) for receiving a carriage, are plane along their entire length, and the guideways for the carriage, are secured at any required location on the said plane surfaces.

It is thus possible to construct support structures having a very simple shape, most frequently parallelepipedic, which enable perfect cast members to be obtained which are free of flaws and bubbles, and the casting core of which may also be designed to a very simple shape. If the support structures are made from welded sheet metal, they may also be very easily constructed since it is then possible to use simply cut plane sheet metal.

The machining of such structures is essentially limited to trimming a mere plane surface covering the length of each carriage-receiving surface by drilling, planing, smoothing or scraping according to the degree of accuracy required.

When guideways of conventional design are integral with the support structure, they are necessarily very long in large machines thereby rendering the machining thereof more difficult. However, by means of the structure proposed, it is possible to construct and machine the guideways independently, in the form of short members which may be mass produced on machines specially designed for this purpose and enabling a very high degree of precision to be obtained at reduced cost.

According to another feature of the invention, when the feed movement of a carriage is effected by means of a rack system of any known type, having straight or inclined teeth, or provided with nut-thread elements, the lateral guiding faces for the carriage are constituted of the two sides of the rack so that guiding is effected in a perfectly symmetrical manner in relation to the drive stress of the carriage.

This arrangement aims at eliminating friction reactions on the guide surfaces of the type which are produced when the drive stress is offset in relation thereto. The result is a considerable decrease in the force necessary to advance the carriage, increased smoothness of the movement, mainly at low speeds, elimination of jerky movements and an improvement in the precision of the longitudinal guiding.

In order that the invention may be more clearly understood, reference will now be made to the accompanying drawings which show certain embodiments thereof by way of non-limiting examples, and in which:

FIGURE 1 shows a cross-section along the line I—I of FIGURE 2 of a machine tool bed in accordance with the invention, assembled to receive a carriage, FIGURE 2 is a section along the line II—II of FIGURE 1, FIGURE 3 shows a perspective view of the bed alone, FIGURE 4 shows a perspective view of a clamping element for assembly on the bed shown in FIGURE 1, FIGURE 5 shows a modification of the bed shown in FIGURE 1, FIGURE 6 shows a perspective view of a clamping element for assembly on the bed shown in FIGURE 5, FIGURE 7 shows a section of another modification of the bed assembly, FIGURE 8 shows a perspective view of a rack element for the assembly shown in FIGURE 7, FIGURE 9 shows to a larger scale, a detail of FIGURE 7, FIGURE 10 shows a cross-section of an upright according to the invention, for supporting a carriage on two surfaces, FIGURE 11 shows a perspective view of the upright only shown in FIGURE 10, and FIGURE 12 shows a modification of the arrangement of FIGURE 10 for the assembly of a carriage to only one surface of the upright.

Referring to the drawings, the bed shown in FIGURE 1 is constituted of a box girder 1, for example of cast iron or welded steel, having a parallelepipedic shape, the upper surface 2 of which is plane and machined all over its entire area (also see FIGURE 3).

The bed 1 is adapted to support a carriage indicated generally at 4 and, to this end, guideways such as 5 and 6 are fixed on the upper plane surface 2 of the bed (see also FIGURE 4).

Each guideway is fixed to the bed 1 by means of screws such as 8, shown only by their axes in the FIGURE 1, which pass through apertures at 9 in the respective guideways (FIGURE 4) and which screw into threaded holes 11 (FIGURE 3) in the bed.

The exact positioning of the guideways on the bed is effected by means of dowel pins mounted, for example, in holes 13, 14 of the guideway 5 (FIGURE 4) and holes 15, 16, of the bed (FIGURE 3), and by a key 18 engaged in corresponding grooves 19 and 21 of the bed and the guideway respectively. The positioning groove of the other guideway 6 on the bed 2, is indicated at 20 in FIGURE 3.

The carriage 4 is driven by any suitable conventional feed means such as a device comprising a lead screw 23 (see also FIGURE 2) mounted in two bearings 24, 25 secured to the upper surface of the bed 2 in the same manner as the guideways, i.e. by means of screws 26, positioning being ensured by a key 45 located in corresponding grooves of the support 24, 25 and in a groove 28 of the bed as well as by locating pins (not illustrated).

FIGURE 5 illustrates a modification of the guide arrangement, wherein the guideways are replaced by a guide bar 31 fixed to the upper surface 2a of the bed 1a by means of screws 32 and positioned by means of a key 33 located in the corresponding grooves of the said guide bar and of the bed, said guide bar being engaged with slight friction in a groove 35 of the carriage 4a.

Two flanges 36, 37 (see also FIGURE 6) which are also secured to the bed 1a and positioned by pins and keys 38, 39, are used solely to hold the carriage 4a against the upper surface 2a of the bed; since the carriage is guided by the bar 31, a certain clearance thus remains between the vertical surfaces of the flanges 36 and 37 and the facing surfaces of the carriage 4a. FIGURE 6 shows the groove 40 of the flange 36 for receiving the positioning key 38 as well as the holes 41 for passage of the fixing screws and 45 for lodging the positioning pins.

For constructional reasons, the feed device operated by the lead screw 23 has been laterally offset in relation to that of the embodiment shown in FIGURE 1, but the means for fixing it to the upper surface 2 of the bed are identical.

It will be noted that in the embodiment according to FIGURE 5, the bed is identical to that of the embodiment shown in FIGURE 1, only the machining thereof differs in the location of the fixing holes of the guide and drive elements for the carriage, as well as the positioning holes and grooves of these elements on the bed.

In the modification illustrated in FIGURE 7, the carriage 4b is again held against the surface 2b of the bed 1b by flanges 36, 37, but the guide bar of the carriage is constituted of the body 42 of a rack 54 which also constitutes part of the control device for feeding the carriage along the bed. The rack is fixed to the surface 2b of the bed by screws such as 43 and it is positioned thereon by a key 44 and positioning pins. The carriage is guided on the two sides of the rack so that the force necessary to advance the said carriage is centred in relation to its two guide surfaces, thereby placing the assembly in the best operating conditions as hereinbefore explained.

FIGURE 9 illustrates a detail of the rack system assembly 42, to a greater scale, on the upper surface 2b of the bed 1b; one surface of the carriage 4b may be particularly seen in contact with a side 46 of the rack 42 and the opposite surface of the said carriage in contact with the gib 47 bearing against the opposite side 48 of the rack 42. Moreover, the clearance between the vertical surfaces of the carriage such as 51 and the facing surfaces 52 of the flanges 36 may also be seen in FIGURE 9.

Reference numeral 53 indicates the toothed pinion engaging with the rack 54 which is cut into the upper surface of the body 42 thereof, the said pinion being mounted on a shaft indicated only by its axis 55, in FIGURE 9, and supported by the carriage 4b.

In FIGURE 8, a rack element 42 is also illustrated, the said elements being separately machined and mounted in end to end relationship at specified positions along the bed.

FIGURES 10 and 11 illustrate an upright 61 used, for example, on a vertical turning mill or a planing machine. This upright has two surfaces 62 and 63 which are plane and machined all over their entire area. As in the bed hereinbefore described, this upright has, on its machined surfaces, grooves 60a, 60b, 60c, 60d, and holes for positioning pins as well as threaded holes for fixing the elements for guiding and driving of the carriages. On the surface 62 of the upright, along which the carriage 64 is to move, are secured guideways 65, 66 which are identical to the side elements 5 shown in FIGURE 4. The guideways 65 are fixed by screws 67 and are positioned by means of a key 68 engaging in the groove 60a of the upright, and positioning pins.

This feed device is, for example, of the lead screw type like the carriage feed device illustrated in FIGURE 2. Supports such as 71 for this lead screw 70 are fixed against the surface 62 of the upright by means of screws 72, the positioning again being effected by means of a key 73 and suitable pins.

The other plane and machined surface 63 of the upright acts to support guideways such as 75 and 76 which are identical to the guideway 5 shown in FIGURE 4 and to the guideways 65, 66, the guideways 75, 76 being fixed to the upright in the same manner as the guideways 65, 66.

FIGURE 12 shows a modification 61a of the upright formed to support the carriage 81 and feed means only on one of its surfaces, the carriage being maintained on such surface by flanges 82, 83, and guided by a guide bar 84 as it is driven by a lead screw device designated generally at 85. The flanges, guide bar and feed device are fixed and positioned on the upright in the manner hereinbefore described.

As a result of this new design of support structure or part thereof, it becomes possible to arrange, at any given point therealong, any support element, fixing element for a guideway or a flange or a drive member of a carriage, since the entire corresponding surface of the support structure is plane and flat.

It is possible to provide guide elements, fixing elements and drive elements having standard shapes and sizes whatever the position at which they are to be placed on the support structure and whatever the face of the structure onto which they are to be secured. Moreover, elements such as guideways, flanges or racks, need not have a length (frequently very large) equal to their total length if made as a one-piece structure. Instead they may be constructed in separate sections of standard reduced length which are determined solely by the easiest manufacturing and machining conditions and not by the length of the support structure.

It will be readily understood that the invention is not limited to the embodiments described and illustrated which are given by way of non-limiting example, and that various modifications may be made thereto according to the application contemplated without thereby departing from the scope of the invention.

I claim:

1. In a machine tool, a frame member having tool feeding element supporting surface portions that are planar and machined true over their entire surface areas, said frame member being a box girder of parallelepipedic shape having one exterior side surface machined true and containing the entire area defined by the total of said frame supporting surface portions in a single plane, and tool feeding elements comprising a carriage, means for guiding said carriage in its reciprocating movements and constituted of a plurality of separate elements having planar surfaces seated on the planar supporting surface portions of said frame member, and fastening means for selectively and detachably securing each of said separate guide elements upon said supporting surface portions at one of a number of given locations, said fastening means comprising a first given number of fastening elements provided on each guide element, a second given larger number of fastening elements provided on said frame member within the area defined by the total of said frame supporting surface portions, and fastening elements selectively engaging said first and second fastening elements to secure each guide element in a given location on said frame member.

2. In a machine tool, a frame member having tool feeding element supporting surface portions that are planar and machined true over their entire surface areas, said frame member being an upright box girder of parallelepipedic shape having two adjacent exterior side surfaces machined true, the entire area defined by the total of said frame supporting surface portions extending over such two machined surfaces, and tool feeding elements comprising a carriage, means for guiding said carriage in its reciprocating movements and constituted of a plurality of separate elements having planar surfaces seated on the planar supporting surface portions of said frame member, and fastening means for selectively and detachably securing each of said separate guide elements upon said supporting surface portions at one of a number of given locations, said fastening means comprising a first given number of fastening elements provided on each guide element, a second given larger number of fastening elements provided on said frame member within the area defined by the total of said frame supporting surface portions, and fastening elements selectively engaging said first and second fastening elements to secure each guide element in a given location on said frame member.

3. In a machine tool, a frame member adapted to support the feeding elements of any one of a plurality of different tools and constituted of a box girder having exterior feeding element supporting surface portions that are planar and continuous with each other, the entire area defined by the total of said planar, continuous supporting surface portions being large enough to support thereon the tool feeding elements for any one of such different tools, the tool feeding elements mounted on said supporting surface portions comprising a carriage and means for guiding said carriage in its reciprocating movements and constituted of a plurality of separate elements having planar surfaces seated on the planar supporting surface portions of said frame member, the planar supporting surface portions of said frame member on which said separate guide elements are seated being machined true, and fastening means for detachably securing each of said separate guide elements upon said supporting surface portions comprising a first given number of fastening elements provided on each guide element, a second given number of fastening elements provided on said frame member within the area defined by the total of said frame supporting surface portions, a third given number of fastening elements engageable with at least one of said first and second fastening elements to properly position the planar seating surfaces of said guide elements upon the planar supporting surface portions of said frame member, and a fourth given number of fastening elements engaging said first and second fastening elements to secure each guide element in its proper position on said frame member.

4. In a machine tool, a frame member forming the bed of such tool and adapted to support the feeding elements of any one of a plurality of different tools and constituted of a hollow box girder having four outer walls each of which provides a continuous, planar, supporting surface throughout its entire width, the planar, continuous area of the supporting surface of each of said walls being large enough to support thereon the tool feeding elements for any one of such different tools, the tool feeding elements mounted on portions of at least one of such supporting surfaces comprising a carriage and means for guiding such carriage in its reciprocating movements and constituted of a plurality of separate elements having planar surfaces seated on the planar supporting surface portions of said frame member, the planar supporting surface portions of said frame member on which said separate guide elements are seated being machined true, and fastening means for detachably securing each of said separate guide elements upon said supporting surface portions comprising a first given member of fastening elements provided on each guide element, a second given member of fastening elements provided on said frame member within the area defined by the total of said frame supporting surface portions, and a third given number of fastening elements engaging said first and second fastening elements to secure each guide element in proper position on said frame member.

References Cited by the Examiner

UNITED STATES PATENTS

| | | | |
|---|---|---|---|
| 464,617 | 12/91 | Sampson et al. | 82—32 X |
| 2,014,667 | 9/35 | Potter | 82—32 |
| 2,111,096 | 3/38 | Fritzsch. | |
| 2,621,552 | 12/52 | Montanus | 82—32 |
| 3,106,117 | 10/63 | Duquesnel | 82—32 |

FOREIGN PATENTS

| | | |
|---|---|---|
| 206,250 | 11/59 | Austria. |
| 1,200,279 | 6/59 | France. |
| 114,178 | 1918 | Great Britain. |

WILLIAM W. DYER, JR., *Primary Examiner.*